US005579445A

United States Patent [19]
Loce et al.

[11] Patent Number: 5,579,445
[45] Date of Patent: Nov. 26, 1996

[54] IMAGE RESOLUTION CONVERSION METHOD THAT EMPLOYS STATISTICALLY GENERATED MULTIPLE MORPHOLOGICAL FILTERS

[75] Inventors: Robert P. Loce; Michael S. Cianciosi, both of Rochester; Jeffrey D. Kingsley, Williamson, all of N.Y.

[73] Assignee: Xerox Corporation, Stamford, Conn.

[21] Appl. No.: 169,487

[22] Filed: Dec. 17, 1993

[51] Int. Cl.⁶ ............................................. G06K 15/00
[52] U.S. Cl. ............................................. 395/102; 382/279
[58] Field of Search ............................. 395/102, 106, 395/108, 112, 114, 115, 117, 139, 128; 382/260, 261, 298, 308, 298, 581

[56] References Cited

U.S. PATENT DOCUMENTS

| | | | |
|---|---|---|---|
| 4,437,122 | 3/1984 | Walsh et al. | 358/166 |
| 4,460,909 | 7/1984 | Bassetti | 346/160 |
| 4,544,264 | 10/1985 | Bassetti et al. | 355/14 R |
| 4,544,922 | 10/1985 | Watanabe et al. | 340/728 |
| 4,625,222 | 11/1986 | Bassetti et al. | 346/160 |
| 4,814,890 | 3/1989 | Kato | 358/284 |
| 4,841,375 | 6/1989 | Nakajima et al. | 353/280 |
| 4,847,641 | 7/1989 | Tung | 346/154 |
| 4,933,689 | 6/1990 | Yoknis | 346/154 |
| 5,005,139 | 4/1991 | Tung | 364/519 |
| 5,029,108 | 7/1991 | Tung | 364/519 |
| 5,134,495 | 7/1992 | Frazier et al. | 358/298 |
| 5,138,339 | 8/1992 | Curry et al. | 346/108 |
| 5,142,374 | 8/1992 | Tajika et al. | 358/298 |
| 5,150,311 | 9/1992 | Long et al. | 395/108 |
| 5,161,035 | 11/1992 | Muramatsu | 358/451 |
| 5,193,008 | 3/1993 | Frazier et al. | 358/298 |
| 5,206,741 | 4/1993 | Shimura et al. | 358/404 |
| 5,301,037 | 4/1994 | Kang et al. | 358/576 |

FOREIGN PATENT DOCUMENTS 0177640  4/1986  European Pat. Off. ........ G06F 15/16

OTHER PUBLICATIONS

James C. Stoffel et al. *A Survey of Electronic Techniques for Pictorial Image Reproduction*, IEEE Transactions on Communications, vol. COM–29, No. 12, Dec. 1981.

L. Steidel *Technology Overview: Resolution Enhancement Technologies for Laser Printers*, Lasermaster Corp., Sep. 1991.

Robert P. Loce et al. *Facilitation of Optimal Binary Morphological Filter Design via Structuring Element Libraries and Design Constraints*, Optical Engineering, vol. 31, No. 5, May 1992, pp. 1008–1025.

Edward R. Dougherty ed, Marcel Dekker 1992, *Mathematical Morphology in Image Processing*, pp. 43–90.

Robert P. Loce et al., *Optimal Morphological Restoration: The Morphological Filter Mean–Absolute–Error Theorem*, Journal of Visual Communications and Image Representation, (Academic Press), vol. 3, No. 4, Dec. 1992, pp. 412–432.

Edward R. Dougherty et al., *Optimal mean–absolute–error hit–or–miss filters: morphological representation and estimation of the binary conditional expectation*, Optical Engineering, vol. 32, No. 4, Apr. 1993, pp. 815–827242.

(List continued on next page.)

*Primary Examiner*—Arthur G. Evans
*Attorney, Agent, or Firm*—Duane C. Basch

[57] ABSTRACT

A method and apparatus for automating the design of morphological or template-based filters for print quality enhancement. A plurality of different phase, but same resolution, subsampled images are generated from training documents. Statistical data derived therefrom is then employed in an automated process to generate filters. The filters may be used for resolution enhancement and/or conversion of bitmap images. Furthermore, the statistical data is used to produce filters that are intended to not only optimize image structure, but image density as well.

21 Claims, 10 Drawing Sheets

Microfiche Appendix Included
(1 Microfiche, 26 Pages)

OTHER PUBLICATIONS

Donald L. Ort *Character Edge Smoothing For Matrix Printing,* Xerox Disclosure Journal, vol. 6, No. 1, Jan./Feb. 1981, p. 19.

XDJ, vol. 5, No. 1, Jan./Feb. 1980, pp. 115–116.

Torrey Pines Research, *Behind Hewlett–Packard's Patent on Resolution Enhancement Technology,* (Becky Colgan ed., BIS CAP Int'l 1990) pp. 1–60.

DP–Tek, Inc., *TrueRes Resolution Transformation Technology,* 6 pages, May 27, 1993.

Adam L. Carley, PhD *Resolution Enhancement in Laser Printers,* XLI Corp. Woburn, Mass., 1993, pp. 1–16.

Robert P. Loce, *Morphological Filter Mean–Absolute–Error Representation Theorems and Their Application to Optimal Morphological Filter Design,* Center for Imaging Science, Rochester, Institute of Tech. (PhD. Thesis), May 1993.

IMAGE RESOLUTION CONVERSION METHOD THAT EMPLOYS STATISTICALLY GENERATED MULTIPLE MORPHOLOGICAL FILTERS

This invention relates generally to a method and apparatus for improving the appearance of printed documents, and more particularly to the design and application of statistically generated, parallel subsample filters to convert and/or enhance the resolution of digital images.

CROSS REFERENCE

The following related applications are hereby incorporated by reference for their teachings:

"Method for Design and Implementation of an Image Resolution Enhancement System that Employs Statistically Generated Look-Up Tables," Loce et al., Ser. No. 08/769,485 filed concurrently herewith;

"Non-Integer Image Resolution Conversion Using Statistically Generated Look-Up Tables," Loce et al., Ser. No. 08/170,082 (U.S. Pat. No. 5,387,985), filed concurrently herewith;

"Method for Statistical Generation of Density Preserving Templates for Print Enhancement," Loce, Ser. No. 08/169,565 (U.S. Pat. No. 5,359,423), filed concurrently herewith; and "Automated Template Design for Print Enhancement," Eschbach, Ser. No. 08/169,483, filed concurrently herewith.

BACKGROUND OF THE INVENTION

Information systems for handling numerous document and data formats are moving towards becoming open systems where different devices are tied to one another to provide versatile solutions to a variety of customer needs. A key factor in these open systems is enabling electronic documents to be printed such that the customer does not perceive any difference between versions printed on different output devices. In order to achieve complete device-independence, efficient methods of accurately altering image resolution without modifying its appearance are required to take advantage of the technology. Hence, raster conversion and enhancement technology, where a bitmap created on or for a first device is altered so as to be printable on a second output device, has become an important aspect of the open system technology.

The present invention is a method for generating resolution conversion/enhancement filters that may be efficiently employed to maintain or improve document appearance, when converting from an original image resolution to an output resolution equal to that of the printing or display device. The filters produced are preferably morphological filters, however template filters may also be generated by the present invention. Compared to template matching filters, morphological filters tend to contain far fewer template patterns (structuring elements), and therefore are much less expensive to implement in a print device. On the other hand, in general, the morphological filter design process is much more complex, and because of the combinatorics involved in the process, the filters are typically restricted to smaller windows, which limit filter goodness. Through the subsampling phase scheme of the present invention, image information is utilized very efficiently, and practical design of relatively high quality, relatively inexpensive, morphological filters is thus enabled.

In the present invention, the resulting image signals may be used to drive devices at the output resolution without negatively impacting spatially sensitive features within the input image. The filters produced using the present invention may be utilized to control a printing device having a scanning beam, where the beam varies in intensity and duration according to the pulses used to control it. As another example, a cathode ray tube uses an electron beam to scan a phosphorous screen. The electron beam may be varied in intensity and duration to accurately display information on the phosphor screen. In both examples, a pulse forming circuit responsive to the output image signal may be used to generate video pulses to control the intensity and operation time of the respective beams.

Mathematical morphology provides a high level, geometric formalism for Boolean logic operations applied to images. It is rooted in set theory, topology, probability, and Minkowski algebra. Although the concepts of morphology hold in N dimensions and are developed for both binary image and gray-scale image operations, the present invention will be described with respect to binary digital images for simplicity. Binary images are treated as a collection of sets (activated, or "black," pixels), and through the Minkowski operations, are operated upon by other sets. The two most primitive morphological operations are erosion and dilation. Two commonly known higher level operations are opening and closing. In the present invention, the morphological operations erosion and dilation are used as they are most relevant to general morphological filtering.

A binary morphological filter is considered to be a very general image mapping: it is a set mapping $\Psi$ that is increasing [$S \subset T$ implies $\Psi(S) \subset \Psi(T)$] and translation invariant [$\Psi(S+z)=\Psi(S)+z$], where S and T are sets within the image space (referred to herein as images), and z is a point set used here for a position vector. For example, "images S and T" may refer to arbitrary patterns within an image field, such as characters in a document. The definition of morphological filter given here is quite general in that many other filter types are subclasses of morphological filters (For example, order-statistic filters [median, max, rain, etc], and in the gray-scale setting, smoothing convolution filters, and the so-called stack filter are all morphological filters).

In the present invention, binary image processing by morphological filtering employs operations that can be reduced to translations and Boolean operations, and may be implemented at high speeds using parallel architecture hardware. Specifically, erosion can be accomplished by translating S to various positions defined by the structuring element, and then performing a logical AND to combine the translations. Images obtained from independently eroding S by several different structuring elements (which make up the filter basis) are combined using a logical OR (union). As a measure of estimation goodness of the filters, minimum mean-absolute error (MAE) is employed. For binary statistically stationary images, MAE may be interpreted as pixel-count error averaged over the image. For a minimal MAE estimator, the optimal morphological filter minimizes the expected error $$MAE(\Psi)=E[|Y(z)-\Psi(S')(z)|] \quad (1)$$

where Y(z) is the desired value of a pixel at z, and $\|(S')(z)$ is the value provided by the morphological filter given observed image S'. Strict-sense stationarity of the image is required for one filter to be optimal throughout the image. This assumption is believed to be reasonably accurate for images of one type. That is, the stationarity condition should be satisfied for an image composed of all text or of all halftone dots.

Previously, various methods and apparatus have been used to alter the resolution of bitmapped images. The following disclosures may be relevant:

U.S. Pat. No. 4,437,122 to Walsh et al. teaches an improved method of converting low resolution images into images of higher resolution for printing so as to simultaneously increase density and smooth character edges. In a CRT display or hardcopy output apparatus, the invention is accomplished by converting an original pixel into a higher resolution 3 x 3 enhanced representation. The status of each of the nine elements in the enhanced representation is determined as a result of an examination of the neighboring pixels of the original pixel.

U.S. Pat. No. 4,544,264 and U.S. Pat. No. 4,625,222, both issued to Bassetti et al. describe enhancement circuits suitable for use in a laser based electrophotographic printing machine. The enhancements are directed at modifying the digital drive signals used to produce the image, including smoothing digitized edges and broadening fine lines in both the horizontal and vertical directions. Leading and trailing edge signals, in both directions are provided to potentially print each black pixel or line as a series of three pixels, a gray leading pixel, overlapped by a central black pixel, which is in turn overlapped by a gray trailing pixel. A similar process is applied for scan lines as well. The series of signals are recombined to effectively control the voltage and current levels of a laser driver.

U.S. Pat. No. 4,690,909 to Bassetti discloses a method and apparatus for enhancing the apparent resolution of electrophotographic printers using a gray dot replacement technique to enhance low resolution output. More specifically, gray or halftone halos are produced along image edges to provide smoothing, while reducing the width of the image regions to avoid thickening thereof as a result of the halo.

U.S. Pat. No. 4,841,375 to Nakajima et al. discloses an image resolution conversion apparatus that converts image data having a predetermined pixel density to a pixel density matching that of a printer so as to enable printing by the printer. The pixel density converter includes: a conversion-pixel position detector for detecting the position of a converted pixel; an original-pixel extractor for extracting a reference original pixel; a conversion-pixel density operation circuit for calculating the density of a conversion pixel; a threshold-value setter for dynamically setting a threshold value; a binary encoding circuit for digitizing the conversion-image density; an input interface for inputting image data; an output interface for outputting image data; and a control circuit for controlling the input/output (I/O) and the conversion operations.

U.S. Pat. No. 4,847,641 and U.S. Pat. No. 5,005,139 to Tung disclose print enhancement circuitry for a laser beam printer. The bit map of a region of the image to be output is compared to a number of patterns or templates. When a match is detected, a section of the bitmap that was matched is replaced with a unique bitmap section designed to compensate for errors. The replacement bitmap section may include predetermined shifting of some dot positions to compensate for the error in the original bitmap section.

U.S. Pat. No. 5,029,108 to Lung teaches an edge enhancement method and apparatus for dot matrix devices wherein a group of gradient mask matrices are applied to a matrix of pixels surrounding a "to be adjusted pixel" so as to determine the existence of an edge and the direction of the brightness change. Once determined, the factors are used to generate a code used to modify the to be adjusted pixel in order to enhance the smoothness of a segment transition.

U.S. Pat. No. 5,134,495 to Frazier et al. discloses a laser-based imaging system that employs a resolution transformation method. The method uses the selective activation in overlapping areas between rasters (scan lines). In one embodiment, a single interleaved pixel, between two scan lines, is formed by the sum of up to six laser pulses at pixel points on adjacent scan lines. In some cases the laser pulses are of insufficient intensity to produce a dot or mark at the point on the scan line where the center of the pulse is received.

U.S. Pat. No. 5,150,311 to Long et al. discloses a system for producing print-dot data suitable for driving a hardcopy printing device. More specifically, the print-dot data is selectively obtained from a conversion operation carried out by a matrix and dot generator combination that respectively generate subtractive color components and a pattern of high resolution print-dots therefrom.

U.S. Pat. No. 5,193,008 to Frazier et al. further describes the resolution enhancement apparatus as one that includes the ability to rasterize the image to be printed at twice the resolution of the printer. The printer then outputs the higher resolution image using an interleaving technique that generates developable dots between scan lines by energizing corresponding dots on adjacent scan lines at a level that will not be developed, but where the overlapping portion of the two corresponding dots will be developable.

U.S. Pat. No. 5,206,741 to Shimura et al. discloses an image processing apparatus for processing image data to be output by a printing unit. A conversion unit converts pixel image data within an image memory into data having a resolution equal to the output resolution of the print mechanism.

U.S. patent application Ser. No. 07/513,415, and the corresponding Japanese laid-open patent publication 4-227584 published Aug. 17, 1992, to Mailloux et al. disclose a method to enable the conversion of binary image data originally generated at a lower resolution into representative binary image data of a higher resolution, wherein the conversion ratio, or magnification factor, is an integer value. Included within the resolution magnification invention are methods for smoothing the interpolated output image and thereby reducing objectionable visual characteristics observable in digitally encoded data using conventional magnification techniques.

A number of the previously described patents and publications are summarized in Torrey Pines Research, *Behind Hewlett-Packard's Patent on Resolution Enhancement*™ *Technology*, (Becky Colgan ed., BIS CAP International, 1990) pp. 1–60, including concepts associated with resolution enhancement.

James C. Stoffel et al. in *A Survey of Electronic Techniques for Pictorial Image Reproduction*, IEEE Transactions on Communications, Vol. COM-29, No. 12, December 1981, incorporated by reference for its teachings, discloses image processing algorithms that can be used to transform continuous tone and halftone pictorial image input into spatially encoded representations compatible with binary output processes. A set of image quality and processing complexity metrics are also defined so as to evaluate a number of image processing algorithms with respect to their ability to reproduce continuous tone or halftone pictorial input.

Of particular relevance are the following publications:

Robert P. Loce et al. in *Facilitation of Optimal Binary Morphological Filter Design via Structuring Element Libraries and Design Constraints*, Optical Engineering, Vol. 31, No. 5, May 1992, pp. 1008–1025, incorporated herein by reference, describes three approaches to reducing the computational burden associated with digital morphological filter design. Although the resulting filter is suboptimal, imposition of the constraints in a suitable manner results in little loss of performance in return for design tractability.

*Mathematical Morphology in Image Processing*, pp. 43–90 (Edward R. Dougherty ed., Marcel Dekker 1992), hereby incorporated by reference, describes efficient design strategies for the optimal binary digital morphological filter. A suboptimal design methodology is investigated for binary filters in order to facilitate a computationally manageable design process.

Robert P. Loce et al., in *Optimal Morphological Restoration: The Morphological Filter Mean-Absolute-Error Theorem*, Journal of Visual Communications and Image Representation, (Academic Press), Vol. 3, No. 4, December 1992, pp. 412–432, hereby incorporated by reference, teach expressions for the mean-absolute restoration error of general morphological filters formed from erosion bases in terms of mean-absolute errors of single-erosion filters. In the binary setting, the expansion is a union of erosions, while in the gray-scale setting the expansion is a maxima of erosions. Expressing the mean-absolute-error theorem in a recursive form leads to a unified methodology for the design of optimal (suboptimal) morphological restoration filters. Applications to binary-image, gray-scale signal, and order-statistic restoration on images are included.

Edward R. Dougherty et al., in *Optimal mean-absolute-error hit-or-miss filters: morphological representation and estimation of the binary conditional expectation*, Optical Engineering, Vol. 32, No. 4, April 1993, pp. 815–827, incorporated herein by reference, disclose the use of a hit-or-miss operator as a building block for optimal binary restoration filters. Filter design methodologies are given for general-, maximum-, and minimum-noise environments and for iterative filters.

Robert P. Loce, in *Morphological Filter Mean-Absolute-Error Representation Theorems and Their Application to Optimal Morphological Filter Design*, Center for Imaging Science, Rochester Institute of Technology, (Ph.D. Thesis), May 1993, incorporated herein by reference, discloses design methodologies for optimal mean-absolute-error (MAE) morphological based filters.

SUMMARY OF THE INVENTION

In accordance with the present invention, there is provided a method for automatically creating a set of filters to be used for filtering an image bitmap, wherein application of the filters will result in an enhancement of the image bitmap, comprising the steps of: (a) generating a first resolution image, represented as a plurality of image signals, from a document and storing the first resolution image in a first bitmap memory; (b) generating a second resolution image, represented as a plurality of image signals, from the document and storing the second resolution image in a second bitmap memory; (c) subsampling the second bitmap memory to produce a subsampled first resolution image; (d) storing, in a subsample memory, the subsampled first resolution image; (e) defining a multiple signal input window that may be passed through the first bitmap memory; (f) defining a single signal output window that may be passed through the subsample memory, so that the position of the output window within the subsample memory is a function of the position of the input window within the first bitmap memory; (g) storing a plurality of entries in a database memory, each entry including a representation of the bitmap pattern within the multiple signal input window and corresponding state found within the single signal output window; and (h) deriving, from the database memory, a set of filters for enhancement of the image bitmap.

In accordance with another aspect of the present invention, there is provided a method for enhancing the printed output of an electronic reprographic system capable of producing printed output in response to a plurality of input image signals representing a bitmap image, comprising the steps of: selecting a target region within the bitmap image; observing the states of a subset of image signals within the target region; generating a plurality of output image signals as a function of the states of the subset of image signals; and recombining the plurality of output image signals so as to produce a sequential stream of output image signals that are used to print the enhanced output.

In accordance with yet another aspect of the present invention, there is provided an electronic printing system, for producing a resolution enhanced printed output, comprising: input memory for storing a plurality of image signals representing a first resolution bitmap image; a morphological filter for generating a plurality of second resolution image signals, wherein the second resolution image signals are an enhanced representation of the first resolution bitmap image; and a marking engine, responsive to the second resolution image signals, for printing the second resolution image signals on an output bitmap.

In accordance with a further aspect of the present invention, there is provided a method for automatically creating a set of filters to be used for filtering an image bitmap, wherein application of the filters will result in an enhancement of the image bitmap, comprising the steps of: (a) generating a first resolution image, represented as a plurality of image signals, from a document and storing the first resolution image in a first bitmap memory; (b) generating a second resolution image, represented as a plurality of image signals, from the document and storing the second resolution image in a second bitmap memory; (c) subsampling the second bitmap memory to produce a plurality of subsampled first resolution images; (d) storing, in a plurality of subsample memories, each of the plurality of subsampled first resolution images; (e) defining a multiple signal input window that may be passed through the first bitmap memory; (f) defining a plurality of single signal output windows that may be passed through the subsample memories, so that the position of the output windows within each of the plurality of subsample memories is a function of the position of the input window within the first bitmap memory; (g) storing a plurality of entries in a database memory, each entry including a representation of the bitmap pattern within the multiple signal input window and corresponding states found within each of the plurality of single signal output windows; and (h) deriving, from the database memory, a set of filters for enhancement of the image bitmap.

Figure 1:
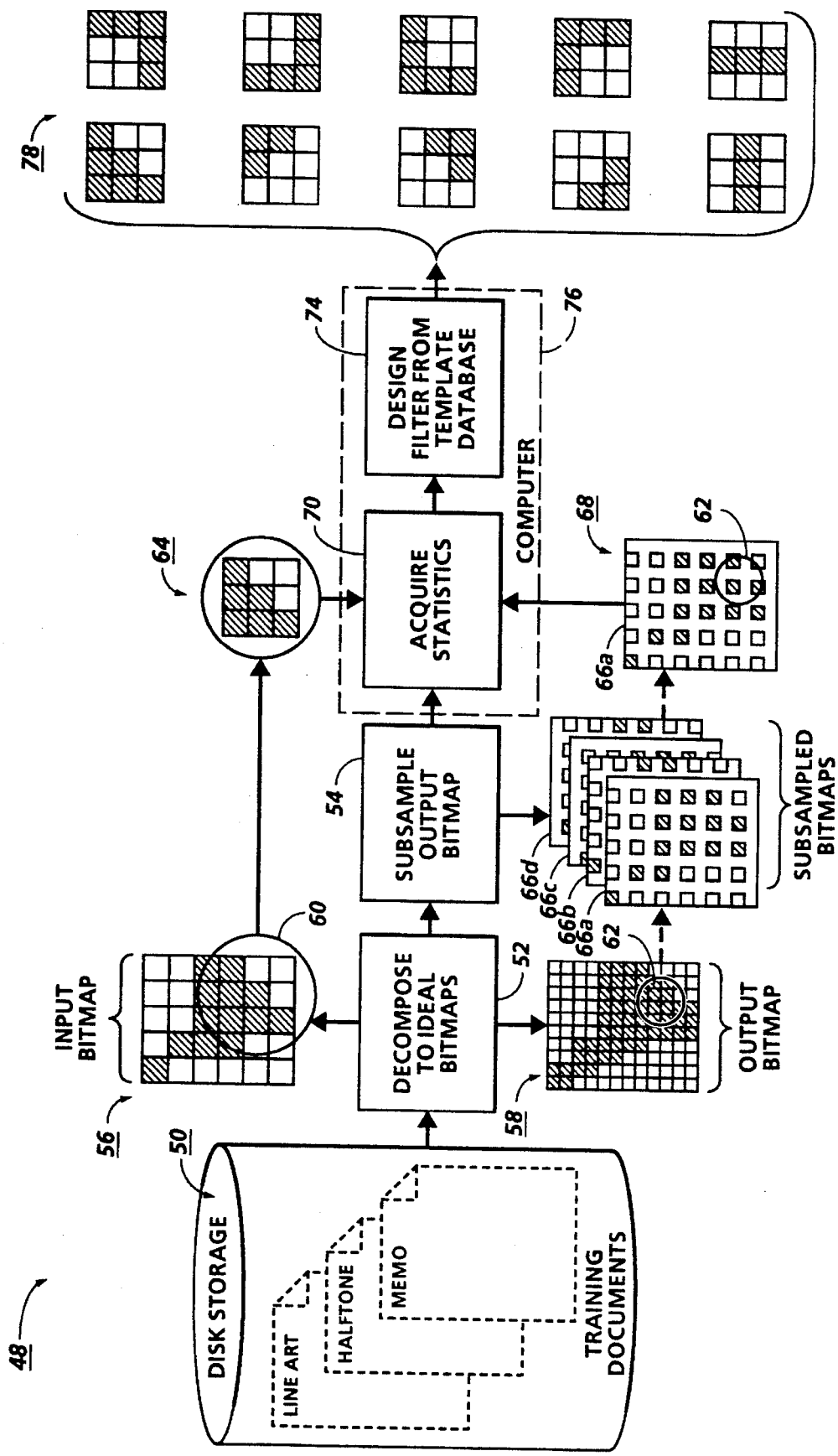
FIG. 1 is a block diagram of a filter design aspect of the present invention.

The present invention will be described in connection with a preferred embodiment, however, it will be understood that there is no intent to limit the invention to the embodiment described. On the contrary, the intent is to cover all alternatives, modifications, and equivalents as may be included within the spirit and scope of the invention as defined by the appended claims.

DESCRIPTION OF THE PREFERRED EMBODIMENT

For a general understanding of the operation of the present invention, reference is made to the drawings. In the drawings, like reference numerals have been used throughout to designate identical elements. The terms image signal, video data, and pixel are used herein to describe discrete digital signals that represent the active (on) or inactive (off) state of an element within a digital image. In addition, shaded or cross-hatched portions of image bitmaps depicted herein are intended to represent black or active pixels (having a value of 1) within the bitmaps. Such a representation is not intended to limit the present invention, but to simplify the description thereof. Accordingly, the present invention may be operated in the same manner by substituting white pixel states wherever black pixels are indicated, and vice versa. Furthermore, the present invention may also be extended to provide resolution conversion and enhancement to gray-scale images.

Design of minimum MAE morphological filters is a nonlinear optimization problem that leads to a system of nonlinear inequalities with no known direct method of solution. Optimal filter design is thus reduced to a search problem. Unfortunately, even in a binary image setting, filter design entails an excessively burdensome computational search for even moderately sized observation windows; the increase in complexity for increasing window size is combinatoric (a 5×5 template requires evaluating all combinations of 33,554,432 structuring elements). The present invention employs a multifaceted design methodology for binary morphological filters based on the imposition of various constraints, the goal being to facilitate a computationally tractable design process. The following three constraints are imposed to render the morphological filter design process practical: (1) Limiting structuring-element size and shape, referred to as window constraint; (2) Limiting the number of structuring elements forming the filter, termed basis size constraint; (3) Limiting the search to structuring elements derived from some library that has been chosen in a expert manner or by first-order statistics, referred to as library constraint. Although this design approach produces a suboptimal filter, judicious choice of constraints yields a filter with nearly optimal performance.

Concerning the search method, the present invention employs a training set of images that are ideally transformed, from which statistics are extracted on how individual structuring elements fit into the patterns of the images. These statistics are used in conjunction with a morphological filter MAE theorem to rapidly evaluate the goodness of employing several structuring elements in combination. Thus, the optimal filter is the set of structuring elements that can yield an image that most closely resembles (in a pixel-count sense) the ideal image of the training set. Note that the automated method for designing structuring elements in accordance with one aspect of the present invention is in contrast to the commonly employed manual approach, which often takes many months of laborious effort.

The design process is generally represented in FIG. 1 which shows a block diagram of a hardware embodiment suitable for carrying out a first aspect of the present invention. The general filter design process shown in FIG. 1 will allow for design of optimized morphological filters and, alternatively, allows for design of optimized template-matching filters. Many aspects of the present invention may be accomplished or simulated using a programmable computer. Accordingly, the microfiche Appendix incorporated as part of this specification includes software code listings that were used to implement one or more steps in the present invention.

In FIG. 1, a set of training documents 50, which are preferably electronic documents stored on magnetic disk or similar media, are initially chosen as representative of printed matter that will be generated by the printer. These training document are then digitized, or more appropriately, decomposed at block 52 into pairs of bitmaps 56 and 58. Input bitmap 56 represents the image, or a portion thereof, at a first or input bit resolution (M), whereas output bitmap 58 represents the image at a second (printer) or output bit resolution (N), where the present invention enables an M-to-N resolution conversion/enhancement.

Figure 2:
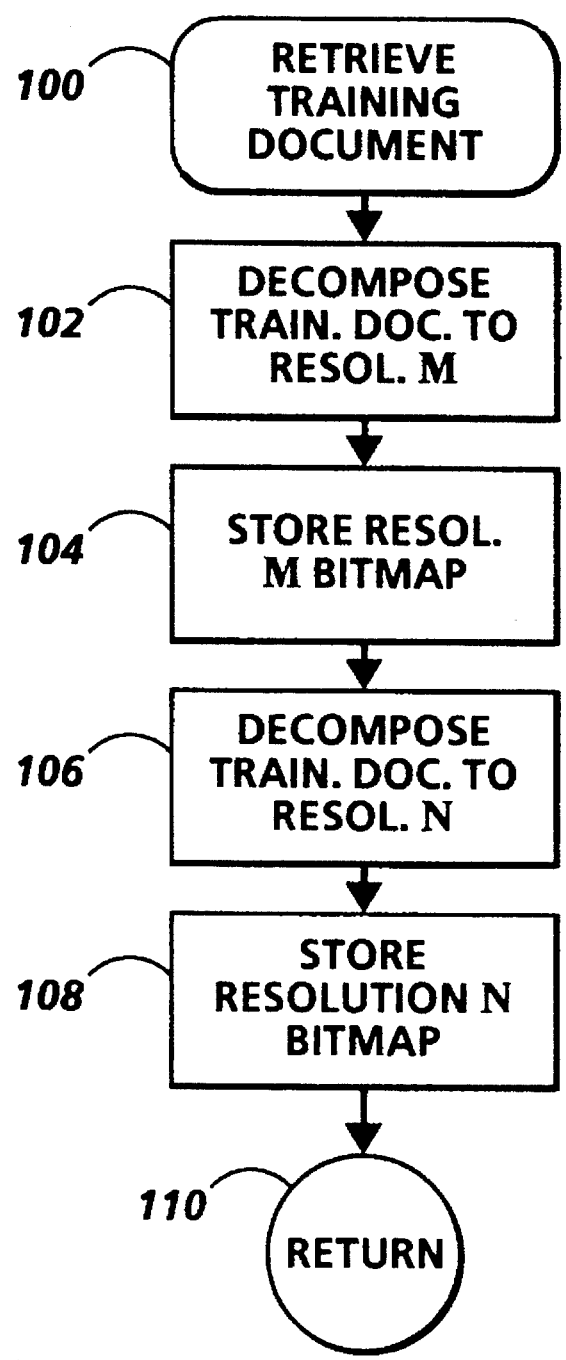
FIG. 2 is a flowchart detailing a portion of the process used to decompose documents in accordance with the embodiment depicted in FIG. 1.

As illustrated in the flowchart of FIG. 2, the decomposition process of block 52 occurs by performing a series of operations to render printable bitmaps from one or more training documents 50. The decomposition process could be performed on a computer platform, such as a SPARC10® (manufactured by Sun Microsystems), or may be accomplished by commercially available page decomposition hardware that is commonly employed in laser-based printing machines available for personal and office use. The training documents, which are preferably documents stored in a page description language (PDL) such as Postscript® (Adobe) or Interpress® (Xerox) are transformed to bitmap representations by the hardware and/or software systems commonly employed in printers capable of receiving such input. As an example, a commonly known Postscript® decomposer could be employed to transform the training document input thereto into a series of digital signals representing the bit stream necessary to drive a 300 spot per inch (spi) printer.

The process steps accomplished at bitmap decomposition block 52 start with the retrieval of a training document from the storage media, step 100. Once retrieved, the training document would be stored in temporary memory and supplied to a decomposer at step 102, implemented in either software or hardware as described above. At the decomposer, the training document is decomposed to produce a bitmap at a first resolution M, for example 300 spots per inch (spi). As it is decomposed, the resulting M resolution bitmap is stored in a first bitmap memory, step 104, as illustrated in FIG. 1 as input bitmap 56. Next, a second resolution bitmap is generated in a similar fashion, where the training document is decomposed to produce a bitmap at a second resolution N, for example 600 spi, at step 106. As it is decomposed, the resulting N resolution bitmap is stored in a second bitmap memory, step 108, and as illustrated in FIG. 1 as output bitmap 58.

In a preferred embodiment, the decomposition operation would be carried out for a number of training documents so as to build numerous sets of corresponding input and output bitmap image pairs at the respective M and N resolutions. While not depicted as such in FIG. 1, it should be noted that the resolution of output bitmap 58 may be anamorphic representations in accordance with the resolution of the image output device. For example, the slow scan (vertical) resolution may be the same in the two bitmaps while the resolution in the fast scan (horizontal) direction is a multiple of the input resolution (M). Note that other methods may be employed to generate a training set of images. For example, the document may be decomposed to only the higher resolution bit map and the lower resolution bit map may be obtained from it by subsampling, averaging, or some related method. This method has the advantage of ensuring that image structures are properly co-located between the two bit maps. Another alternative concerns starting with a hardcopy form of the training document. The bitmap forms can then be obtained by scanning the hardcopy with a document scanner that is capable of operating at the required resolutions. Also, it should be noted that the resolution of output bitmap 58 may consist of multiple-bit-per-pixel representations in accordance with the resolution of the image output device. Although the multiple filter resolution enhancement and conversion method of the present invention is described primarily in terms of morphological filters, the multiple filter concept may be implemented using template matching filters, and in that case design for multiple-bit-per-pixel output is tractable.

Figure 3:
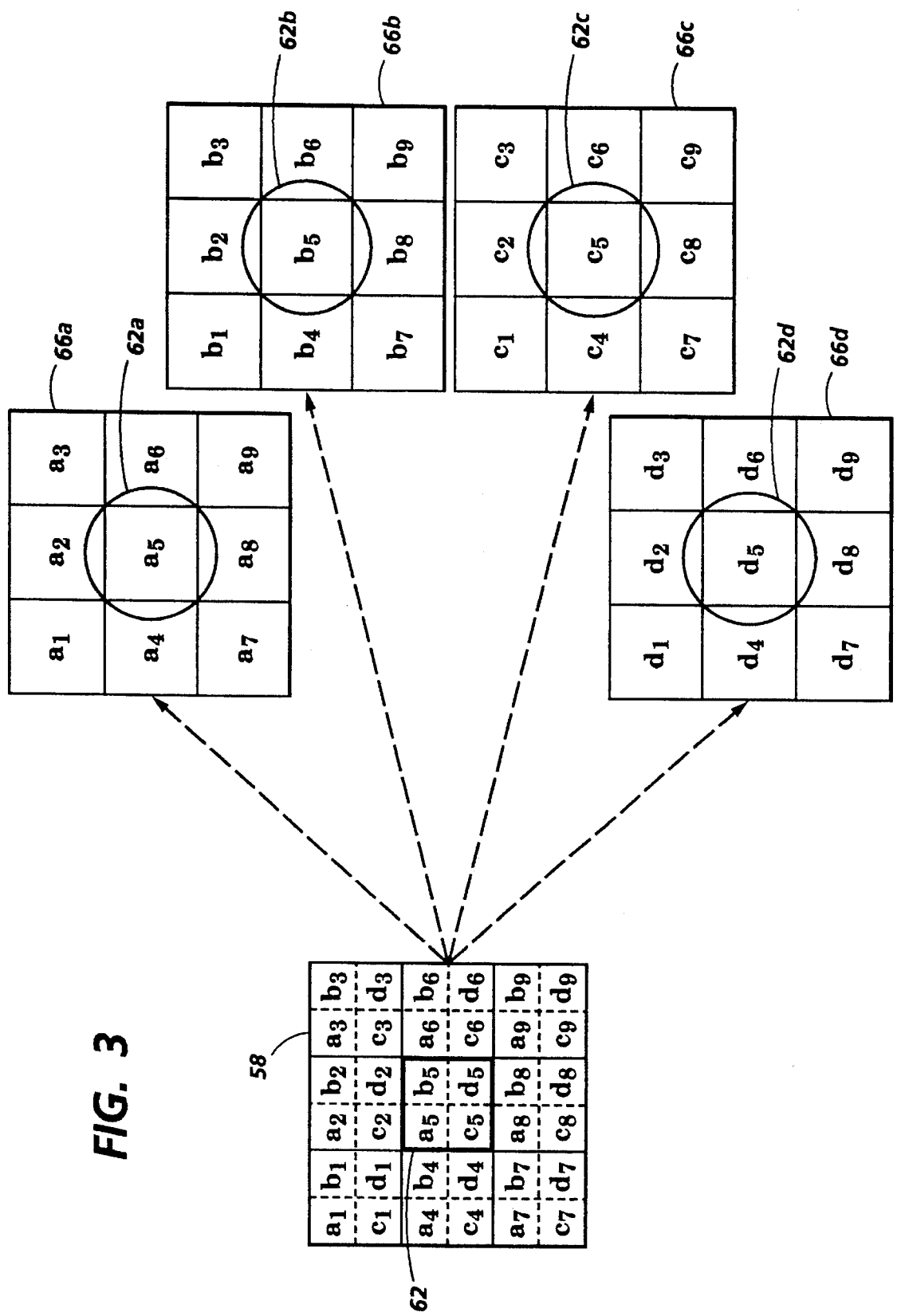
FIG. 3 is a detailed illustration of the subsampled image sections illustrated in FIG. 1.

Once the decomposition has been completed for input and output resolutions M and N, respectively, the process continues at subsampling block 54. At the subsampling block, stored output bitmap 58 is sampled as illustrated in detail by FIG. 3. Specifically, the N resolution bitmap is subsampled so as to produce subsampled bitmaps 66a, 66b, 66c, and 66d therefrom, where the number of subsampled images is determined by the ratio of the resolution conversion to be accomplished. For example, a conversion from 300×300 spi resolution to 600×600 spi resolution would require four sets of subsampled training bitmaps as illustrated in FIGS. 1 and 3. As FIG. 3 shows, the subsampling of N resolution image 58 is based upon common phase relationships amongst the pixels or image signals therein. Once the subsampled images are obtained, they are stored in unique subsampled image memories so as to be available for further processing at acquire statistics block 70 of FIG. 1. Included in the Appendix is a computer program entitled phaseout.c that has been used to demonstrate the subsampling concept relative to the overall filter design method.

As illustrated in FIG. 1, the operations of acquiring statistics, block 70, and designing the filter, block 74, are preferably accomplished by a computer 76. In a preferred embodiment, the computer could be a SPARC10® (manufactured by Sun Microsystems), which is capable of acquiring statistics from several pages of training documents within a few hours. However, less powerful machines could accomplish the tasks in a longer period of time. In general, the acquire statistics block sequentially moves a pair of windows 60 and 62 through the input and subsampled bitmaps, respectively, to locate corresponding pixel combinations that are produced by the decomposition block for identical regions of the target document. While locating the corresponding input and subsampled output combinations, block 70 stores the combinations in a database and collects statistics on the combinations.

Figure 4:
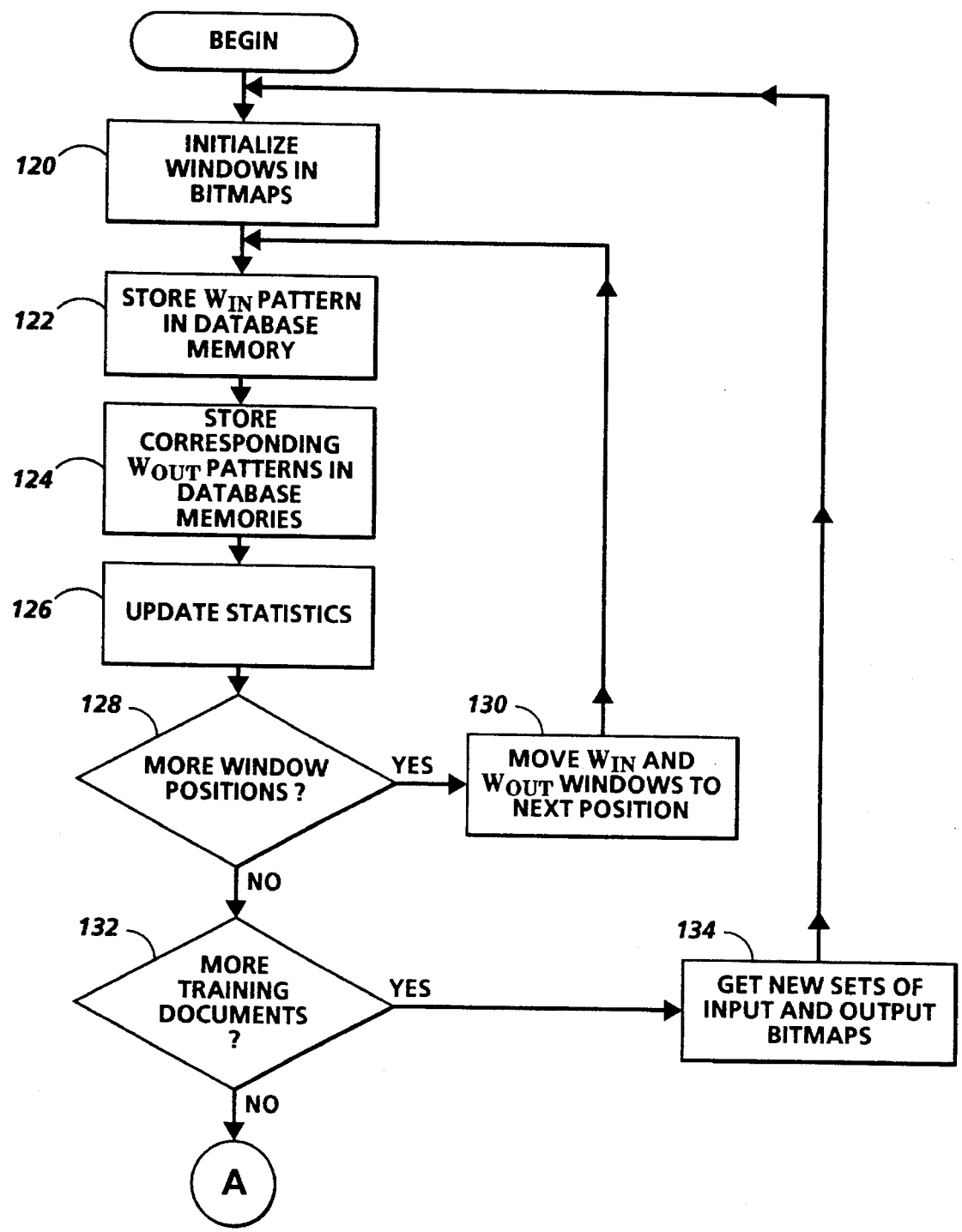
FIG. 4 is a flowchart detailing a portion of the process used to acquire statistics on the decomposed bitmaps in accordance with the embodiment depicted in FIG. 1.
Figure 5:
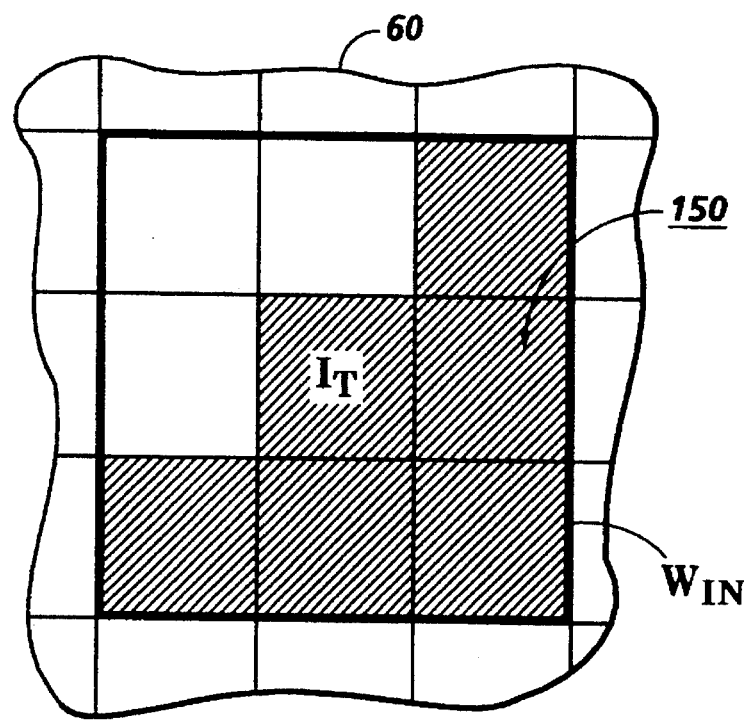
FIGS. 5 and 6 respectively illustrate corresponding positions of the image bitmaps generated by the decomposition operation detailed in FIG. 2.
Figure 6:
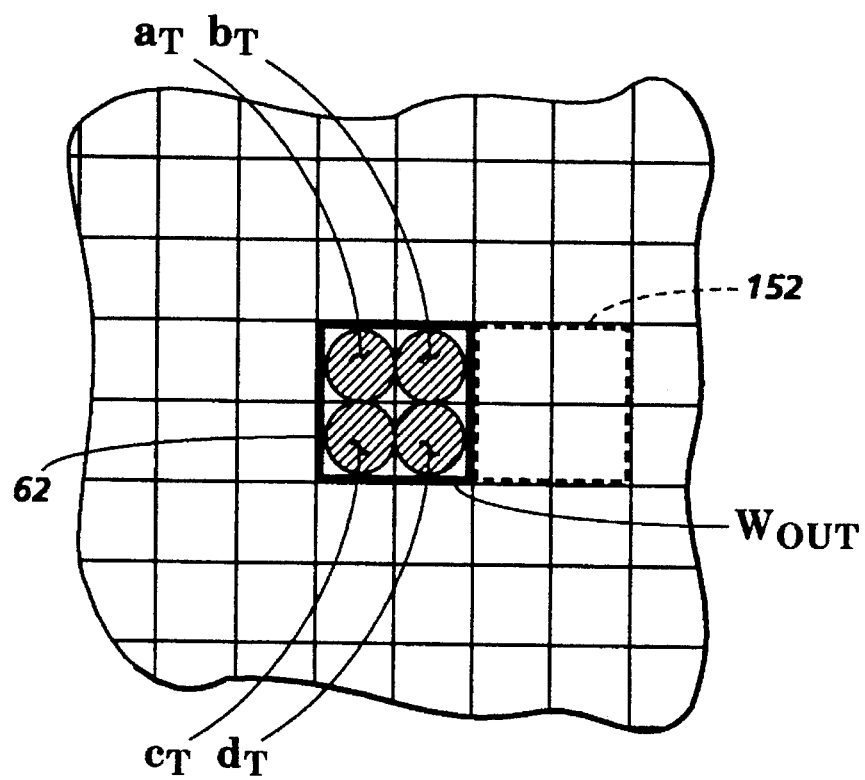

Conceptually, the most straightforward method of acquiring structuring element statistics relevant to the design process consists of the following steps. First, consider a single image training pair, one member being the input M resolution image and the other member being an M resolution subsampling of the N resolution document. Proceed by listing all possible structuring elements of the output window $W_{OUT}$. For each structuring element perform a morphological erosion on the input image. Then find the mean-absolute-error (MAE) between the eroded image and the subsampling of the ideal output image. Store the MAE value for each structuring element, which is the key statistic that enables an efficient search for an optimized morphological filter. Software that has been used to test this statistics acquisition method is included in the Appendix, entitled imtomae1c.c A more general statistics acquisition scheme is illustrated in FIG. 4, where joint pattern statistics may be gathered and converted to a form suitable for morphological filter design or for template matching filter design. FIG. 4 illustrates the operation of acquire statistics block 70 and is a flowchart depicting the processing steps accomplished by the block. Initially, template and pattern windows are established within both the input and subsampled image bitmaps, respectively, step 120. As illustrated in FIGS. 5 and 6, respectively, the input bitmap window, or template window, $W_{IN}$, encloses a plurality of input pixels surrounding an input pixel position $I_T$, while the output pattern window $W_{OUT}$ theoretically encloses a series of output pixel positions $a_T$, $b_T$, $c_T$, and $d_T$. However, as previously described with respect to FIG. 3, the output image has been subsampled to produce a plurality of image bitmap planes, 66a, 66b, 66c, 66d, all having the same resolution as the input bitmap. Thus, equivalent output windows 62a through 62d would be moved through the corresponding subsampled image planes to determine the state of the output pixels in each of the subsampled image planes.

The example illustrated in FIGS. 5 and 6 is representative of an M-to-N transition where N=2M. Thus, for every target input pixel position $I_T$, output pixels in the four subsampled image signals ($a_T$, $b_T$, $c_T$, $d_T$) are created within the output bitmap. Alternatively, a larger input window $W_{IN}$ may be used to provide more context for the transformation. Also, pixels for more, or fewer, output pixel positions (i.e., a different sized or shaped output pattern window ($W_{OUT}$) may be generated in association with the input window.

Returning to FIG. 4, once the template window and pattern window have been established, the pattern of pixels within both windows (e.g., the template representing the binary states of the pixels in a window) are associated with one another and a database entry representing the pixel patterns occurring in the input template window is stored in a database for the corresponding subsampling phase, as represented by steps 122 and 124, assuming that an identical $W_{IN}$ pattern has not been previously detected. If an identical pattern has previously been detected and stored, fields within the database entry corresponding to the subsampled pixel state (black or white) are incremented so as to track the total number of occurrences for black and white pixels in the subsampled image plane corresponding to the detected input pattern.

The purpose of the occurrence fields is to keep track of the number of times that subsampled positions contain black and white pixels for a given co-located input template pattern. In subsequent iterations, whenever an identical $W_{IN}$ pattern is already present in the database, a black or white occurrence field associated with the database entry for the $W_{IN}$ pattern is incremented, step 126, to indicate the occurrence of a black or white pixel within the output pattern window $W_{OUT}$. Use of the database in this manner enables the collection of statistical information with respect to the subsampled pixel state most frequently produced in response to a given pattern of pixels in the input template. As an example, the following could be a partial representation of the subsampled image database entries for the output patterns detected for the input template pixel pattern illustrated in FIG. 4:

|  | INPUT | Black Occurrences | White Occurrences |
| --- | --- | --- | --- |
| Phase a | 001011111 | 2 | 23 |
| Phase b | 001011111 | 20 | 5 |
| Phase c | 001011111 | 20 | 5 |
| Phase d | 001011111 | 24 | 1 |

Once an input template entry has been created, step 128 executes a test to determine if there remain further pixel positions within the input and subsampled bitmaps that have not been processed. If so, step 130 causes the position of windows $W_{IN}$ and $W_{OUT}$ to be advanced to corresponding locations in their respective bitmaps. For example, window $W_{IN}$ would be moved so that the target input pixel position $I_T$ is located at a horizontally adjacent pixel position 150 in FIG. 4, output window $W_{OUT}$ would, theoretically, be moved horizontally to the position theoretically indicated by reference numeral 152, and the process steps 122 through 128 would be repeated.

Similarly, step 132 determines if the database being compiled is complete by testing whether the bitmaps generated from all the training documents have been exhausted. If not, the previously described process is repeated for any remaining input and output bitmap pairs. Otherwise, the generation of the template database entries and compilation of statistics is complete.

For designing a morphological filter the following reduction of statistics is performed to convert these general pattern statistics to a form suitable for the design process. A file must be generated of MAE for each possible template of the input window when that template is used as a morphological erosion filter. After examining the entire image, for each observed input pattern some number of 1's and some number of 0's will be observed in the ideal output image. Let k and m represent the number of 1's and 0's, respectively. These tallies will be used in the MAE calculation. Now define supersets and nonsupersets of the pattern vectors. For a vectorized observed pattern, say 01011 (for a simple 5 pixel $W_{IN}$), each vector that contains these same 1's in the vector is a superset. For this example, the supersets are 01011, 01111, 11011, 11111. All other 32−4=28 patterns are nonsupersets. For each pattern from 000...1 to 111...1 MAE must be calculated and the values written out to a file. MAE for a given vector is calculated by adding all the 0 tallies (all m) for the supersets of the vector and all the 1 tallies (all k) for the nonsupersets, then divide the sum by the number of output pixels observed in the training process.

Figure 7:
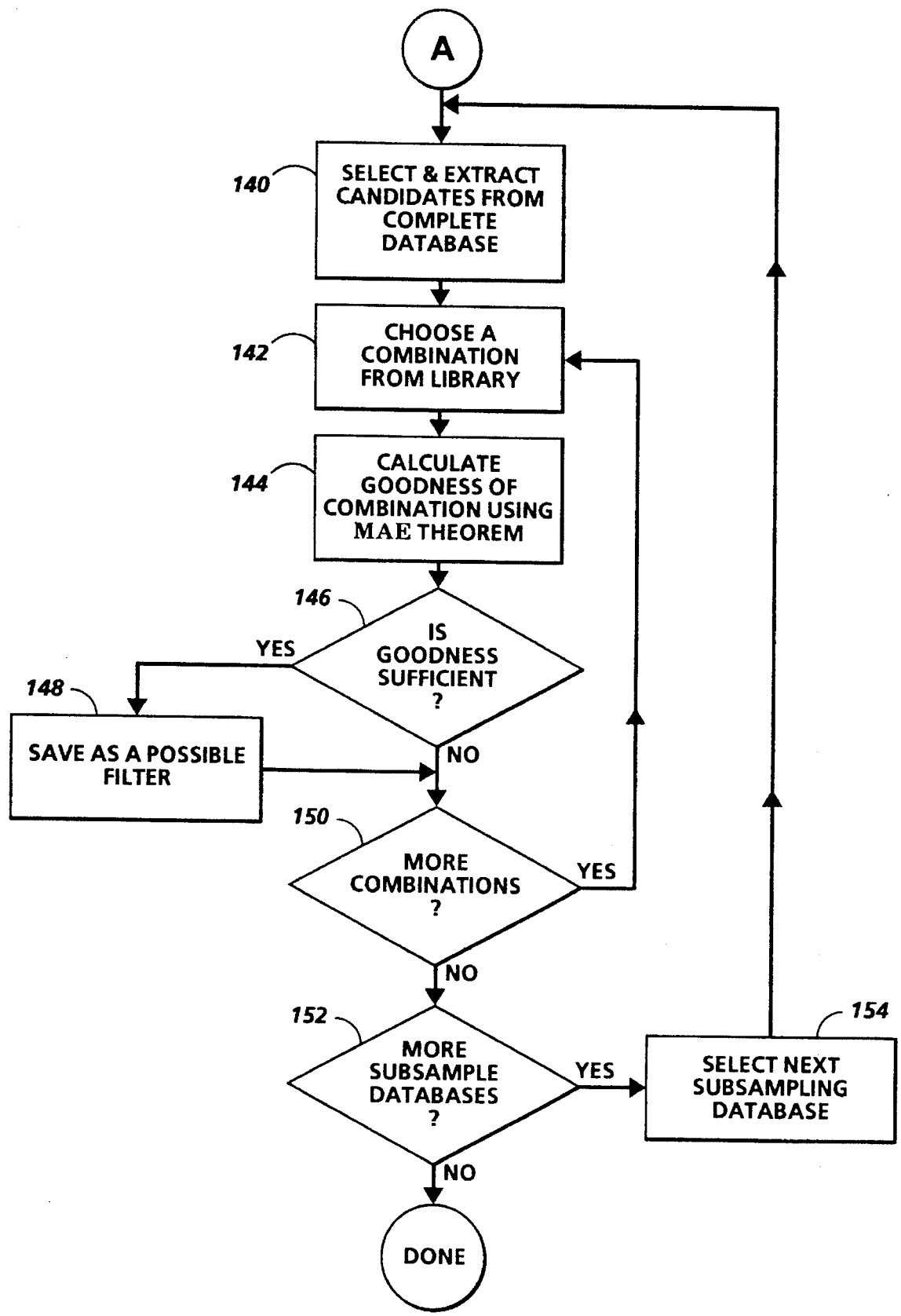
FIG. 7 is a flowchart illustrating various aspects of the process used to automatically design a morphological enhancement filter in accordance with the present invention.

Given the structuring elements and statistics in the form described above, the design process proceeds as in FIG. 7. A library of structuring elements that are considered "good candidates" for filter elements are chosen from the file, step 140. This set of elements may be chosen using expert knowledge or by using first-order statistics, where the elements are chosen that have the lowest individual MAE. Two computer programs are included in the microfiche Appendix that can be used to generate libraries: folib.c extracts first-order libraries from the data base and ordse.f places them in decimal order to allow for efficient searching in the next step of the process. Next, the library and statistics file are read into memory whereupon combinations of structuring elements are selected and evaluated for goodness by using the morphological filter MAE theorem, steps 142 and 144, respectively. If a combination meets a prechosen goodness criterion, as tested at step 146, then it is suitable as a resolution enhancement filter and is stored at step 148. Instead of establishing a goodness criterion a preferred method of selection is to select the combination that yields minimum MAE. As indicated in FIG. 7, all combinations are evaluated, as represented by step 150, and the process is repeated for each of the subsample databases as represented by steps 152 and 154. A computer program entitled mae-searl.f, also included in the Appendix, has been used to read in the reduced statistics data base and structuring element library, choose combinations, evaluate their MAE, and write out combinations that yield MAE lower than a chosen value. Note that a basic morphological filter design process is described in detail in *Mathematical Morphology in Image Processing*, pp. 43–90 (Edward R. Dougherty ed., Marcel Dekker 1992).

Figure 8:
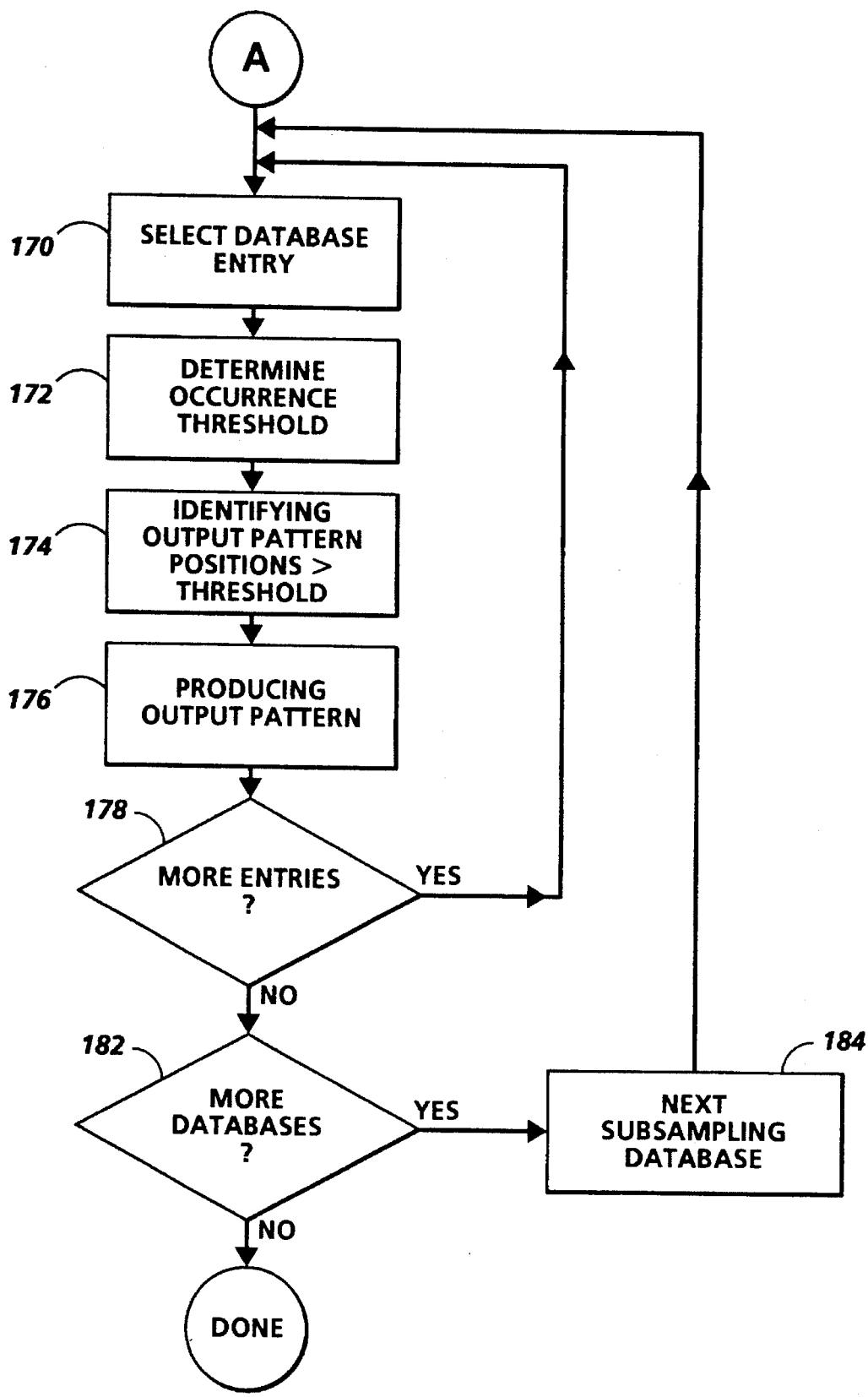
FIG. 8 is a flowchart illustrating various aspects of the process used to automatically design a template matching enhancement filter in accordance with the present invention.

The filter design process for template matching filters is illustrated in the flowchart of FIG. 8, where for each unique input template pattern entry in a subsample database the occurrence information is analyzed. Specifically, at step 170 a subsample database entry is selected for analysis. Next, an occurrence threshold is determined for the entry as a function of the number of occurrences of the input template pattern. To design a filter that achieves the same input/output density relationship as the training set, the threshold is preferably chosen to be about one-half of the number of occurrences of the input template (step 172). Alternatively, other functions of the number of occurrences can be used for the threshold if a density change is desired. At step 174, the threshold is applied to the output pixel field and those output pixels that have occurred in an activated state more times than the threshold are chosen to be activated in the output pattern, and the converse for the pixels that have been activated fewer or equal times to the threshold. Subsequently, at step 176, the identified output pixel positions are used to produce the output pattern. In other words, a filter 78 (FIG. 1) is produced so that the statistically preferred output pixel state will be generated by the subsampling filter whenever the input pattern for that entry is detected in an image input to an image rendering device employing the subsampling filters. The above process is then repeated for each entry in the database, as represented by test step 178, to generate a filter that may be used in a digital image rendering device.

As an additional step 180, the database may be optimized so as to reduce its size to one that is implementable within a look-up table or as a logic equation, for example in an application specific integrated circuit (ASIC). A partial reduction in size may be achieved by passing the look-up table, which is equivalent to a Boolean logic expression, through a logic reduction algorithm (as described by Dougherty and Loce, in *Optimal Mean-Absolute-Error Hit-or-Miss Filters: Morphological Representation and Estimation of the Binary Conditional Expectation*, Optical Engineering, Vol. 32, No. 4, April 1993, pp. 815–827, previously incorporated by reference. Additional "pruning" of the number of generated templatepattern pairs in the database may be required to further reduce the filter to the maximum allowed size. Other statistical pruning methods are described in copending application "Method for Statistical Generation of Density Preserving Templates for Print Enhancement," by Loce, Serial No. 08/XXX,XXX (Attny. Docket No. D/93381Q). That copending application also describes filter iteration techniques that can improve overall filter goodness, and those goodness improvement techniques are applicable to the present invention as well.

Another method of reducing filter size concerns a variation of the filter architecture. Consider a training set image pair of the input M resolution image and a subsampling of the N resolution bitmap. Prior to statistics acquisition, a logical "exclusive or" (XOR) could be performed on the bitmaps to generate an image plane where activated pixels represent pixels in the M resolution bitmap that should have their state changed to be converted to an enhanced bitmap. Statistics acquisition is then performed on the M resolution image and the XOR image and filter design proceeds as described above. There is a tendency for a much smaller filter to result from this design process because there tends to be far fewer activated pixels in the XOR image compared to the subsampling of the N resolution image. In application in a printing device, the filter operates on in the input M resolution image to produce a difference image that is XORed with the input to generate a subsampled phase of an enhanced N resolution image. Similar filters are applied to generate the other subsampled phases of the enhanced N resolution image.

After one subsample database has been optimized, if further subsample databases remain to be analyzed, as determined by step 182, they are individually selected and processed as previously described, step 184.

Turning now to FIG. 8, once designed (FIG. 1, block 70) and optimized by design process 48 a set of statistically designed morphological or template-based filters 78 (FIG. 1) may be applied by digital printer 212. More specifically, a first resolution bitmap image 210 would be presented to a digital printer 212 to produce printed output at a second resolution. Within a digital printer employing a resolution enhancement/conversion filter produced using the previously described method, enhancement filter 214 transforms the input bitmap into an enhanced bitmap image 216. The enhanced bitmap image is then passed to marking engine 218 for exposure and development, as described in the copending application for "Image Resolution Enhancement Using Statistically Generated Look-Up Tables," Loce et al., Serial No. 08/XXX,XXX (Attny. Docket No. D/93380), previously incorporated herein by reference, to produce enhanced output print 220.

Figure 9:
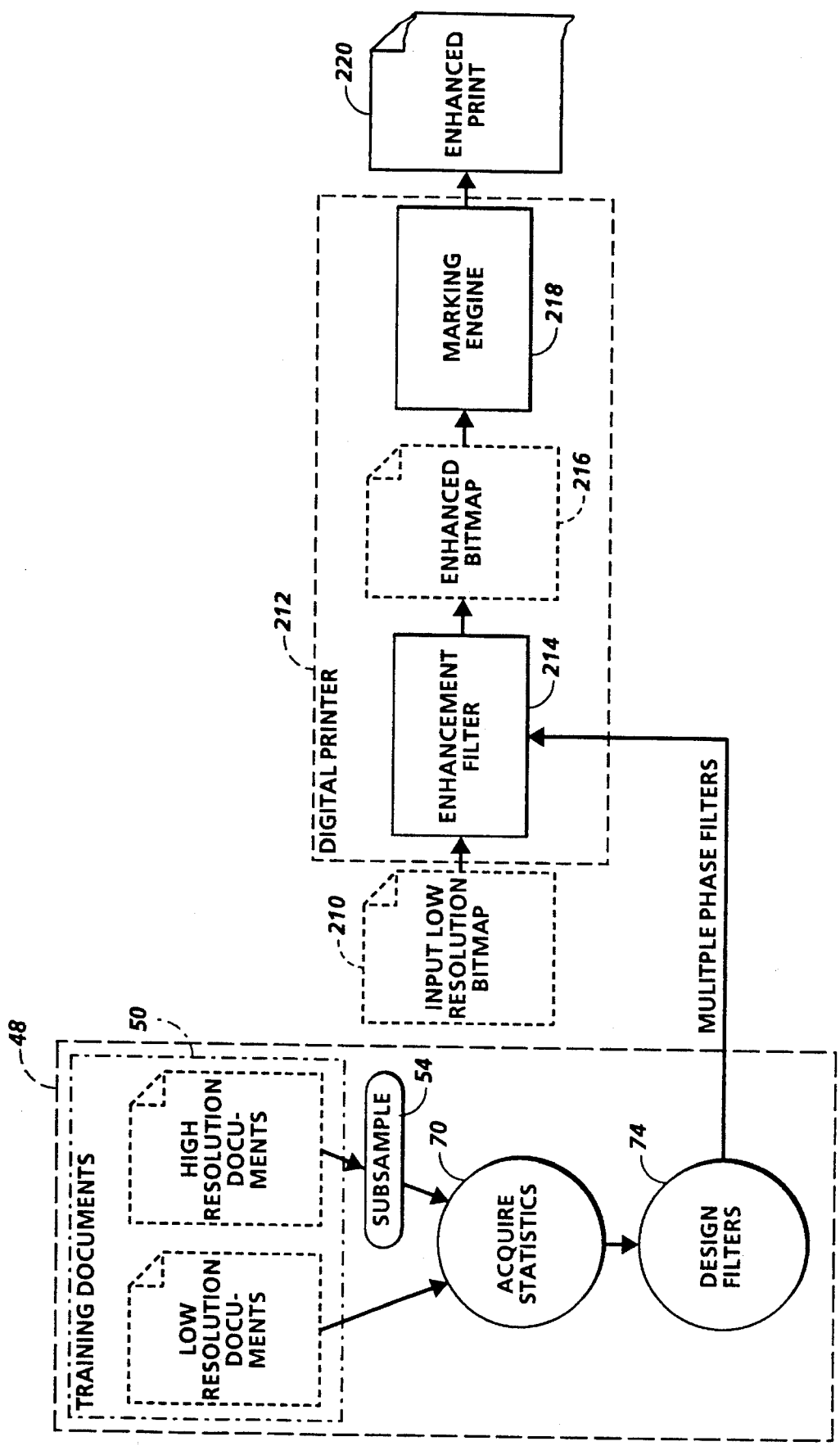
FIG. 9 is a block diagram illustrating the various stages in the process used to design the resolution conversion/enhancement filters of the present invention and further illustrating how such filters may be employed in a digital printer.
Figure 10:
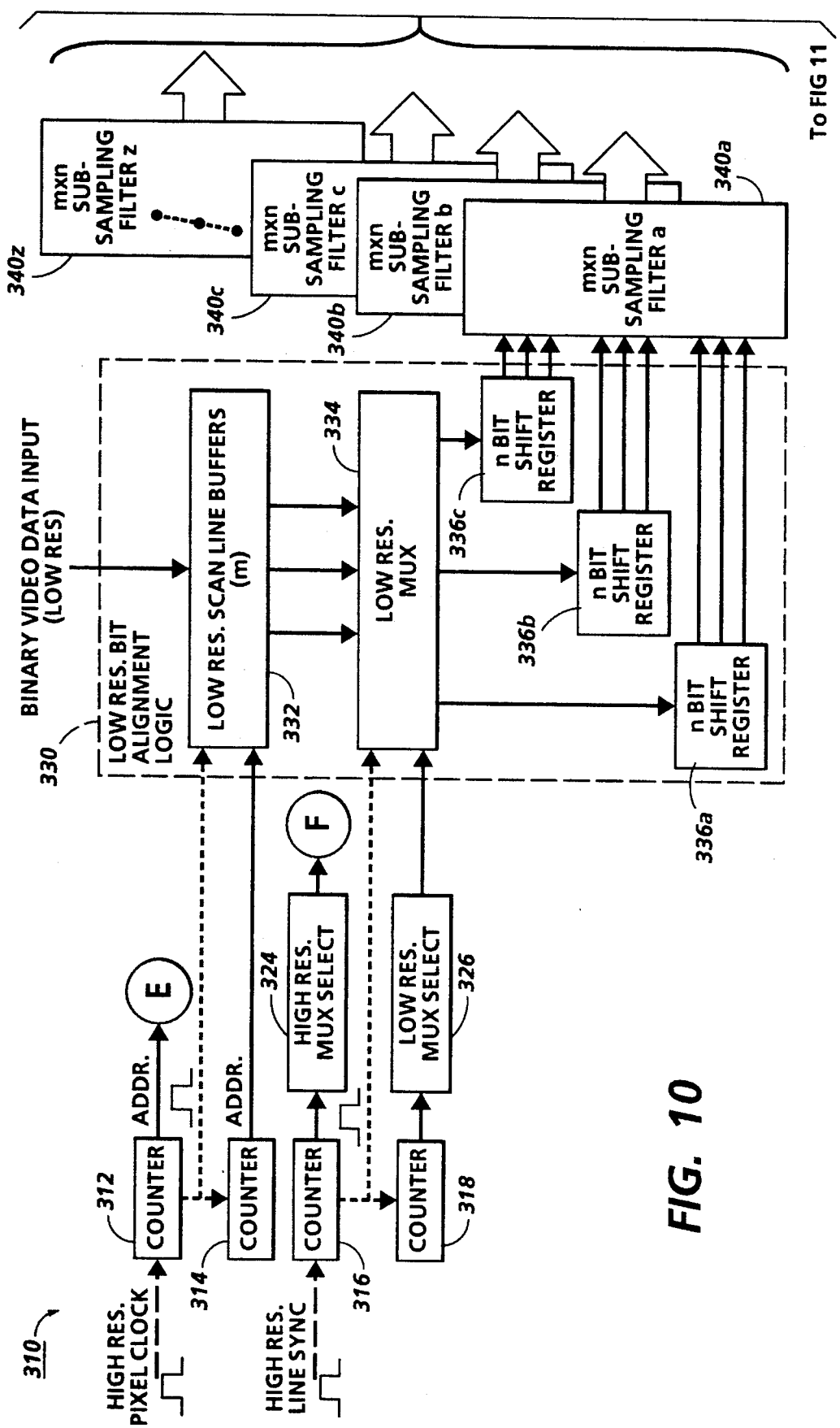
FIGS. 10 and 11 are a block diagram illustrating an embodiment of the subsampling enhancement filter illustrated in FIG. 9 in accordance with the present invention.
Figure 11:
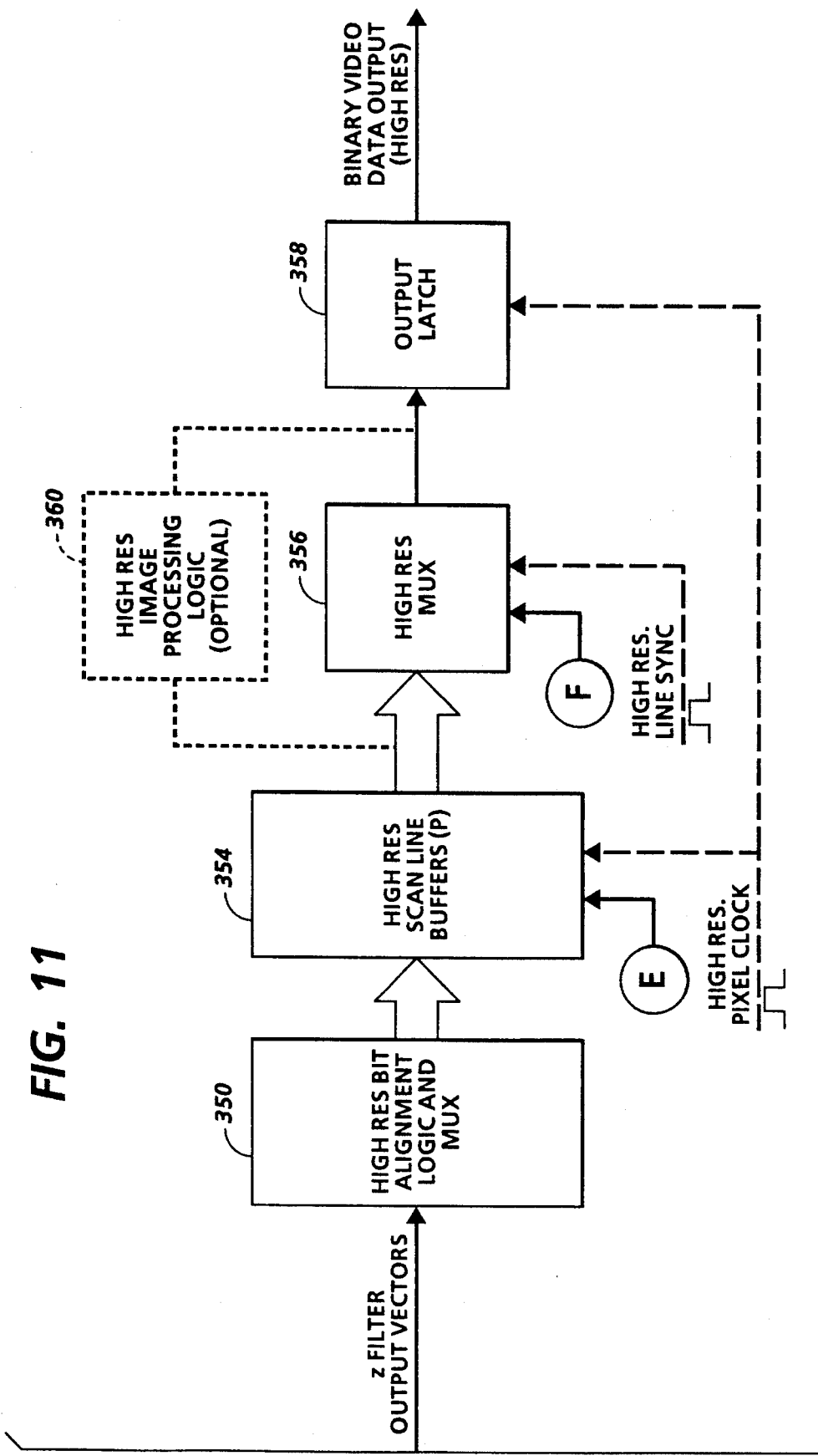

Turning next to FIGS. 9 and 10, where details of a hardware embodiment for enhancement filter 214 are illustrated, it is apparent that the subsample phase filters are implemented to process video data, or image signals, in a parallel architecture. In general, the input video data from low resolution bitmap 210 is used to generate a plurality of subsample enhanced video signals. The subsample enhanced signals are then merged to generate an enhanced bitmap image. As illustrated in FIGS. 9 and 10, a cascaded counter section, 310, is used to generate address information for pixel and scanline buffers. Specifically, high resolution pixel counter 312 receives as input a high resolution pixel clock signal. On each pixel clock pulse, high resolution pixel counter 312 increments and outputs an address to the high resolution scanline buffers 354. Counter 312 also has a carryout line that is connected to low resolution pixel counter 314. Low resolution pixel counter 314 receives the pulses from counter 312 and produces an address to the low resolution scanline buffer 332. Moreover, the storage of individual pixel signals of the low resolution video data is controlled in synchronization with the low resolution pixel clock signal output by counter 312.

Counters 310 also control the operation of the low resolution and high resolution multiplexers, 334 and 356, respectively. High resolution line synch counter 316 counts the pulses of the high resolution line synch signal. Output of the high resolution line synch counter 316 is used to drive the high resolution multiplexer selector block 324, that in turn determines which of the high resolution scanline buffers, 354, is selected by high resolution multiplexer 356 for supplying output. In a similar fashion, low resolution line synch counter 318 generates output that is passed to low resolution multiplexer 326 to control the selection of the appropriate low resolution scanline to be fed to one of the shift registers 336a, 336b, or 336c.

Low resolution scanline buffers 332, low resolution multiplexer 334 and shift registers 336 together form the low resolution bit alignment block 330, that essentially produces an m×n matrix of digital image signals that are input, in parallel, to a plurality of subsampling filters 340. In the embodiment depicted in FIG. 9, rn and n respectively represent the slow and fast scan dimensions of the input window ($W_{IN}$) within which the morphological comparisons will be performed. Subsampling filters 340a, 340b, etc. each produce at least one output vector in response to the image signals represented by the m×n matrix. In addition, the output vectors may be either single-bit or multi-bit signals. The output vectors from the subsampling filters are then passed to high resolution bit alignment logic block 350 of FIG. 10. There the output vector signals are selected using a multiplexing operation to produce the appropriately interleaved set of high resolution image signals to be transferred sequentially to a plurality of high resolution scan line buffers indicated by reference numeral 354. An example of the interleaving scheme accomplished by block 350 was illustrated in FIG. 3.

In the high resolution scan line buffers, the image signals are latched or clocked by the high resolution pixel clock, while the positions of the signals within the scan line buffer are controlled by the high resolution pixel clock counter 312. Subsequently, the pixels stored in scan line buffers 354 are sequentially selected on a scan line basis by the high resolution multiplexer 356, and output, in seriatim, as video signals by output latch 358, which is synchronized by the high resolution pixel clock. Hence, the resulting output will be a stream of video image signals oriented in a proper fashion and produced at a rate suitable for meeting the rate of the high resolution pixel clock. As a further option, image processing logic block 360 may be used to process the high resolution image signals prior to their being latched for output by output latch 358. A possible image processing operation could be an additional filtering iteration to further enhance the high resolution bitmap.

Optimal morphological filtering, as accomplished by the present invention, is a general binary image transformation tool that may be applied to resolve several image processing problems. The hardware embodiment of the present invention is particularly well suited for problems requiring a small number, preferably less than 10, of modest sized templates on the order of 5×5 pixels. Also, the design methodology that is part of the present invention requires an ideal "before" and "after" set of images (referred to as a training set), from which the appropriate statistics may be extracted. The morphological filter produced by the present invention is optimal for statistically stationary images. That is, it will be most effective if the image is of one type (e.g., all text, all halftone, etc.) or the image has been segmented and the filter operates on a statistically uniform portion of the image. Note that, in application, morphological filtering may be reduced to a string of Boolean operations. Because the filters designed by the present invention are preferably small in terms of basis size (number of templates) and window size, implementation could be performed with high speed, inexpensive image processing hardware that is reducible to an application specific device.

The present invention finds practical use in several applications. One application is enhancement of scanned documents. For example, scanned bitmaps often need to be processed for either aesthetic reasons or to enable more accurate further processing, such as automatic character recognition. Several different enhancement filters may be stored in the scanner to correct one or more commonly known digitized text problems. For example, digitized text may possess ragged edges, and for appearance reasons, it is desirable to smooth these edges. Or, a document of light optical density may have been scanned, resulting in thin or broken characters. Unless reconnection is performed, inaccurate character recognition results. A corresponding problem occurs on dark documents, where the problem manifests as two or more connected characters. Morphological filters for each degradation could be stored in the scanner or an associated image processing device. Either the user, or the intelligence within the scanner could choose a filter to correct the problem at hand. The resolution enhancement scheme of the present invention could be used to correct these scanning artifacts as well as producing smoother appearing, higher resolution images as described above.

Another application in which the present invention would find use is appearance matching or tuning. In general, this concerns adjusting a bitmap that is to be printed on a given printer, but which was designed for printing on a system with different tone reproduction and line width characteristics, and possibly a different pixel addressability. For example, bitmap fonts designed for use in a charged-area development printer may require thinning when used in a discharged-area development system. The design methodology of the present invention has proven effective in designing optimal filters to thicken or thin characters. In most cases, converting to higher resolution or use of multiple bits per pixel is needed for appearance matching applications, since line tuning in sub-pixel increments is required.

In recapitulation, the present invention is a method and apparatus for automating the design of morphological or template filters for print quality enhancement, and more particularly to the use of subsampled images generated from training documents, and statistical data derived therefrom, in an automated process that generates the filters. The filters may then be used for resolution enhancement and/or conversion of bitmap images in accordance with the present invention. Furthermore, the statistical data is used to produce filters that are intended to not only optimize image structure, but image density as well, in the bitmap image produced using the filters designed by the present invention.

It is, therefore, apparent that there has been provided, in accordance with the present invention, a method and apparatus for automatically designing filters that are then applied in a subsampling fashion to image signals so as to accomplish resolution conversion and/or enhancement of an input image. While this invention has been described in conjunction with preferred embodiments thereof, it is evident that many alternatives, modifications, and variations will be apparent to those skilled in the art. Accordingly, it is intended to embrace all such alternatives, modifications and variations that fall within the spirit and broad scope of the appended claims.

We claim:

1. A method for automatically creating a set of filters to be used for filtering an image bitmap, wherein application of the filters will result in an enhancement of the image bitmap, comprising the steps of:

(a) generating a first resolution image, represented as a plurality of image signals, from a document and storing the first resolution image in a first bitmap memory;

(b) generating a second resolution image, represented as a plurality of image signals, from the document and storing the second resolution image in a second bitmap memory;

(c) subsampling the second bitmap memory to produce a subsampled first resolution image;

(d) storing, in a subsample memory, the subsampled first resolution image;

(e) defining a multiple signal input window that may be passed through the first bitmap memory;

(f) defining a single signal output window that may be passed through the subsample memory, so that the position of the output window within the subsample memory is a function of the position of the input window within the first bitmap memory;

(g) storing a plurality.of entries in a database memory, each entry including a representation of the bitmap pattern within the multiple signal input window and corresponding state found within the single signal output window; and (h) deriving, from the database-memory, a set of filters for enhancement of the image bitmap.

2. The method of claim 1, wherein the step of generating a second resolution image further comprises generating a second resolution image wherein the second resolution is an integer multiple of the first resolution.

3. The method of claim 1, further comprising the step of selecting the document from a plurality of training documents representative of image bitmaps upon which the set of filters is to be used.

4. The method of claim 1, wherein step (a), the step of generating a first resolution image, comprises:

retrieving, from a storage media, a document comprised of descriptive signals intended to represent the document in a page description language;

storing the descriptive signals representing the document in temporary memory;

decomposing the descriptive signals to produce a first resolution image; and storing the first resolution image in a first bitmap memory.

5. The method of claim 4, wherein step (b), the step of generating a second resolution image, comprises:

decomposing the descriptive signals to produce a second resolution image; and storing the second resolution image in a second bitmap memory.

6. The method of claim 3, wherein steps (a) through (g) are repeated for the plurality of training documents prior to execution of step (h).

7. The method of claim 1, wherein the step of storing a plurality of entries in a database memory further comprises the steps of:

establishing an entry that may be indexed in accordance with the bitmap pattern of the multiple signal input window, unless such a pattern already exists within the database memory; and incrementing a count stored in memory fields associated with the single signal output window in accordance with the state of the signal in the single signal output window, so that a total number of occurrences of each signal state is recorded for the subsample memory.

8. The method of claim 1, wherein the step of deriving a set of filters further comprises the step of conducting a statistical analysis of the database memory to isolate structure elements.

9. The method of claim 8, wherein the step of conducting a statistical analysis of the database memory comprises:

selecting an input pattern entry in the subsample database;

determining an occurrence threshold for the selected entry as a function of the number of occurrences of the input pattern;

applying the occurrence threshold so as to indicate for activation a subsampled position having an occurrence value greater than the occurrence threshold; and producing a template filter which assures activation of the subsampled position whenever the selected input pattern entry is detected in an input image.

10. The method of claim 1, wherein the step of deriving a set of filters further comprises:

accumulating, from the database entries, a set of general pattern statistics;

calculating the mean-absolute-error for each multiple signal input window pattern stored in the database when the pattern is used as a morphological erosion filter;

selecting, based upon the mean-absolute-error for each pattern, a library of patterns to be considered for filter elements;

sequentially evaluating combinations of patterns for goodness; and producing a morphological filter from those combinations of patterns having a mean-absolute-error less than a predetermined threshold, so as to assure activation of the subsampled position whenever a selected pattern is detected in an input image.

11. The method of claim 10, wherein the step of selecting a library of patterns includes applying a set of first-order statistics so as to select for the library of patterns, those patterns having the lowest individual mean-absolute-error.

12. The method of claim 10, wherein the step of sequentially evaluating combinations of patterns for goodness includes determining the goodness as a function of the morphological mean-absolute-error of each combination of patterns.

13. The method of claim 1, further comprising the step of applying the set of enhancement filters to an input image, represented by a plurality of image signals, to produce an enhanced output image.

14. The method of claim 13, wherein the step of applying the set of enhancement filters to an input image to produce an enhanced output image, comprises the steps of:

selecting a target region within the input image;

observing the states of a subset of image signals within the target region;

generating a plurality of output image signals as a function of the states of the subset of image signals; and recombining the plurality of output image signals so as to produce a sequential stream of output image signals to form the enhanced output image.

15. A method for automatically creating a set of filters to be used for filtering an image bitmap, wherein application of the filters will result in an enhancement of the image bitmap, comprising the steps of:

(a) generating a first resolution image, represented as a plurality of image signals, from a document and storing the first resolution image in a first bitmap memory;

(b) generating a second resolution image, represented as a plurality of image signals, from the document and storing the second resolution image in a second bitmap memory;

(c) subsampling the second bitmap memory to produce a plurality of subsampled first resolution images;

(d) storing, in a plurality of subsample memories, each of the plurality of subsampled first resolution images;

(e) defining a multiple signal input window that may be passed through the first bitmap memory;

(f) defining a plurality of single signal output windows that may be passed through the subsample memories, so that the position of the output windows within each of the plurality of subsample memories is a function of the position of the input window within the first bitmap memory;

(g) storing a plurality of entries in a database memory, each entry including a representation of the bitmap pattern within the multiple signal input window and corresponding states found within each of the plurality of single signal output windows; and (h) deriving, from the database memory, a set of filters for enhancement of the image bitmap.

16. The method of claim 15, wherein the step of generating a second resolution image further comprises generating a second resolution image wherein the second resolution is an integer multiple of the first resolution.

17. The method of claim 15, further comprising the step of selecting the document from a plurality of training documents representative of image bitmaps upon which the set of filters is to be used.

18. The method of claim 15, wherein step (a), the step of generating a first resolution image, comprises:

retrieving, from a storage media, a document comprised of descriptive signals intended to represent the document in a page description language;

storing the descriptive signals representing the document in temporary memory;

decomposing the descriptive signals to produce a first resolution image; and storing the first resolution image in a first bitmap memory.

19. The method of claim 18, wherein step (b), the step of generating a second resolution image, comprises:

decomposing the descriptive signals to produce a second resolution image; and storing the second resolution image in a second bitmap memory.

20. The method of claim 19, wherein steps (a) through (g) are repeated for the plurality of training documents prior to execution of step (h).

21. The method of claim 15, wherein the step of storing a plurality of entries in a database memory further comprises the steps of:

establishing an entry that may be indexed in accordance with the bitmap pattern of the multiple signal input window, unless such a pattern already exists within the database memory; and incrementing a count stored in memory fields associated with each of the single signal output windows in accordance with the state of the signals in the single signal output windows, so that a total number of occurrences of each signal state is recorded for each subsample memory.

\* \* \* \* \*